UNITED STATES PATENT OFFICE.

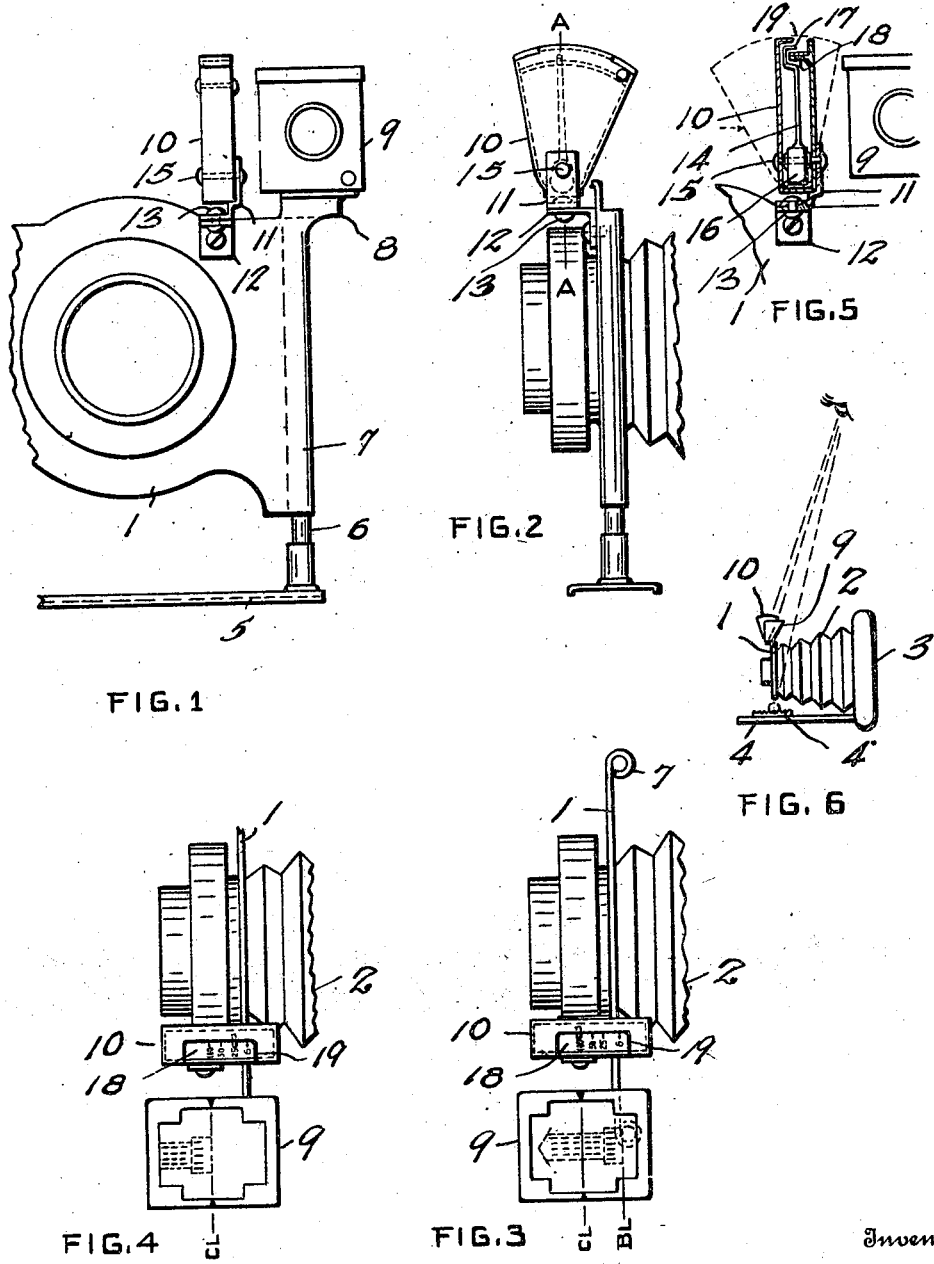

FRANK C. REYNOLDS, OF COLUMBUS, OHIO, ASSIGNOR TO JOHN B. MOORE, OF COLUMBUS, OHIO.

DISTANCE-FINDER FOR CAMERAS.

1,299,030.   Specification of Letters Patent.   Patented Apr. 1, 1919.

Application filed April 3, 1915.   Serial No. 18,996.

*To all whom it may concern:*

Be it known that I, FRANK C. REYNOLDS, citizen of the United States of America, residing at Columbus, in the county of Franklin and State of Ohio, have invented certain new and useful Improvements in Distance-Finders for Cameras, of which the following is a specification.

The present invention relates to improvements in distance finders for cameras.

In practically all standard photographic cameras of the focusing type, an image finder is employed in connection with a graduated scale by means of which the camera is brought to the proper focus when photographing an object, but unless the distance of the object from the camera is ascertained with positiveness and accuracy, in many instances, a poor picture is the result. This is particularly true when the operator is an amateur and it is necessary to resort to guessing at the distance of the object from the camera.

By the utilization of the device of my present invention, I am enabled to ascertain the precise distance between the object and the camera, and having ascertained this distance, by resorting to the focusing scale as employed on standard cameras, the camera may be focused with precision and despatch, in a simple and efficient manner.

In the accompanying drawings I have illustrated one complete example of the physical embodiment of my invention as used in conjunction with the usual image finder and a customary focusing scale, the invention being constructed according to the best mode I have so far devised for the practical application of the principles of my invention.

Figure 1 is a front elevation of a portion of the front plate of a focusing camera showing the image finder and my improved distance finder in juxtaposition.

Fig. 2 is a side view of the device of Fig. 1 but with the image finder omitted for convenience in illustrating the distance finder of my invention.

Fig. 3 is a top plan view showing an object located in the image finder just before measuring the distance to the object.

Fig. 4 shows the parts of Fig. 3 tilted forward (to the left) and measuring the distance as seen in the image finder.

Fig. 5 is a central vertical sectional view on line A—A Fig. 1 through the housing of the distance finder disclosing the gravity pendulum or pivoted needle therein.

Fig. 6 is a diagrammatic view showing the compact arrangement of the image finder, the distance finder, and the focusing scale, all in close vision of the eye.

In the exemplifying structure in the drawings I have employed a standard focusing camera for the purpose of illustrating my invention, and it will be understood that the device of the invention may be applied to cameras already in use, or it may be used as part of the equipment of a new instrument. The usual front plate 1, bellows 2, case 3, bed 4 and focusing scale 4' are shown in Fig. 6, while the base plate 5, post 6, sleeve 7 and supporting bracket 8 for the image finder 9, are clearly depicted in Figs. 1 and 2. These parts make up a portion of the standard focusing and folding camera as now in extensive use, and do not require extended description, but they are used to show the application thereto of my distance finder.

The distance finder includes a metallic housing 10 attached to the front plate or lens frame 1 through the medium of two angle brackets 11 and 12, the former attached to the housing and the latter fixed to the frame 1, while the brackets themselves are adjustably connected together through the medium of a rivet 13 extending through alined perforations in the brackets. By means of this rivet, which forms a pivotal connection between the brackets so that the housing may be turned on its pivot support through an arc of 90 degrees, the housing and entire finder may be turned to the dotted position shown in Fig. 5. When turned to this dotted position the finder may be used as a level when the camera is in operative position, or, when the bed 4 is being folded to nest in its case 1, the finder is out of the way and does not interfere with the facile nesting of the parts.

Within the housing a gravity pendulum or needle 14 is pivoted at 15, and the lower end of the pendulum is weighted at 16 while the upper end is formed with a pointer 17. The weight 16 of course holds the pendulum or needle always in an upright position when the lens frame is extended in operative position, and a shelf 18 fixed in the housing and curved on the arc of a circle with the pivot or rivet 15 as a center bears a scale showing lineal feet measure from 6 to 100 which may be seen through the opening 19 in the top of the housing. The opening may have a transparent cover therein if desired to protect the markings of the scale.

In using the distance finder, the image is first located in the image finder 9 for instance as shown in Fig. 3 where a building is indicated by dotted lines. When the building has been properly located as shown, the camera is then tilted forward and downward (to the left in the drawings) until the base of the image coincides with the indicator or center line (C L) of the image finder as in Fig. 4. The housing is of course tilted forward with the camera, but the pendulum still remains upright, the weight holding it in this position on the pivot. The needle or pointer is thus brought to the designation 25 which indicates the object or building to be located 25 feet from the camera. The camera is then focused for the ascertained distance by means of the focusing thumb wheel as usual, and the camera is thus quickly and accurately adjusted for use.

It will be noted that the arrangement and location of the distance finder in close proximity to the image finder permits the eye to have close supervision over the two finders and the focusing wheel and scale simultaneously, and this close arrangement of parts is particularly advantageous when focusing on movable or moving objects, and it will be noted that this may be done without the necessity of moving the camera or changing its position. When taking horizontal exposures, the camera is of course turned to the side as usual, after focusing.

The C L or center line or indicator on the image finder, or the arrow heads at the sides of the finder may be located at any point desired, either to the right or to the left of the C L shown, and of course the reading findings on the scale in the housing of the distance finder would necessarily be predetermined and located accordingly.

What I claim is:—

1. The combination in a distance finder including a camera frame and a fixed bracket thereon, a second bracket pivoted on the first bracket and capable of horizontal adjustment, a housing and a weighted pendulum pivoted therein and the pivotal support for the pendulum connecting the housing and second bracket, a scale in the housing, and a needle on the pendulum coacting with the scale, whereby the position of the finder may be adjusted.

2. The combination with a camera and an image finder carried thereby having an indicator, of a distance finder including an angle bracket secured on the camera, a second bracket horizontally pivoted in the first for adjusting the finder, a housing and a weighted pendulum pivoted therein and the pivotal support for the pendulum connecting the housing and second bracket, a scale in the housing, and a needle on the pendulum coacting with the scale.

In testimony whereof I affix my signature.

FRANK C. REYNOLDS.